US008373805B2

(12) United States Patent
Carlsgaard et al.

(10) Patent No.: US 8,373,805 B2
(45) Date of Patent: Feb. 12, 2013

(54) SYSTEM AND METHOD FOR REMOTE CONTROL OF A TELEVISION WITH A MANUALLY ACTUATABLE ELEMENT

(75) Inventors: Eric Stephen Carlsgaard, Zionsville, IN (US); Mark Gilmore Mears, Zionsville, IN (US); James Duane Tenbarge, Fishers, IN (US)

(73) Assignee: Shenzhen TCL New Technology Ltd, Shenzhen, Guangdong (CN)

( * ) Notice: Subject to any disclaimer, the term of this patent is extended or adjusted under 35 U.S.C. 154(b) by 526 days.

(21) Appl. No.: 12/529,097

(22) PCT Filed: Apr. 24, 2007

(86) PCT No.: PCT/US2007/010133
§ 371 (c)(1),
(2), (4) Date: Aug. 28, 2009

(87) PCT Pub. No.: WO2008/130362
PCT Pub. Date: Oct. 30, 2008

(65) Prior Publication Data
US 2010/0118211 A1 May 13, 2010

(51) Int. Cl.
*H04N 5/44* (2006.01)
(52) U.S. Cl. ........................................................ 348/734
(58) Field of Classification Search .................. 348/734, 348/725; 340/1.1, 12.22–12.24, 12.3, 12.54; H04N 5/44
See application file for complete search history.

(56) References Cited

U.S. PATENT DOCUMENTS

| 5,883,619 | A | 3/1999 | Ho et al. |
| 5,912,612 | A | 6/1999 | DeVolpi |
| 6,801,262 | B2 | 10/2004 | Adrain |
| 7,006,881 | B1 | 2/2006 | Hoffberg et al. |
| 7,012,652 | B1* | 3/2006 | Weber ............................ 348/632 |
| 7,170,420 | B2* | 1/2007 | Phifer ......................... 340/12.55 |
| 7,220,925 | B2 | 5/2007 | Kubo et al. |
| 7,248,150 | B2 | 7/2007 | Mackjust et al. |
| 7,907,118 | B2* | 3/2011 | Matsui et al. .................. 345/156 |

(Continued)

FOREIGN PATENT DOCUMENTS

| EP | 1052849 A1 | 11/2000 |
| WO | WO 97/04431 A1 | 2/1997 |

(Continued)

OTHER PUBLICATIONS

PCT International Search Report and Written Opinion for PCT/US2007/010133, dated Feb. 6, 2008.

(Continued)

*Primary Examiner* — Sherrie Hsia
(74) *Attorney, Agent, or Firm* — Fletcher Yoder, P.C.

(57) ABSTRACT

There is provided a system and method for remote control of a television with a manually actuatable control element. More specifically, in one embodiment, there is provided a remote control for a television with a manually actuatable control element. The remote control may comprise a manually actuatable control element configured to generate a signal in response to an activation of the control element by a user, wherein the signal is generated at one of a plurality of different levels based on a characteristic of the activation, and a control system configured to receive the signal and to produce one of a plurality of television commands in response to the signal, wherein the command produced corresponds to the level of the signal.

18 Claims, 6 Drawing Sheets

U.S. PATENT DOCUMENTS

| | | |
|---|---|---|
| 2002/0167540 A1 | 11/2002 | Dobbelaar |
| 2003/0001816 A1 | 1/2003 | Badarneh |
| 2003/0013424 A1* | 1/2003 | Adrain .................. 455/161.1 |
| 2003/0067445 A1 | 4/2003 | Hirshberg et al. |
| 2005/0154988 A1 | 7/2005 | Proehl et al. |
| 2006/0028454 A1 | 2/2006 | Branton et al. |
| 2006/0059515 A1 | 3/2006 | Miyazawa |
| 2006/0164383 A1 | 7/2006 | Machin et al. |
| 2006/0164403 A1 | 7/2006 | Volckers |
| 2006/0181429 A1 | 8/2006 | Garrison |
| 2007/0066394 A1* | 3/2007 | Ikeda et al. .................. 463/37 |

FOREIGN PATENT DOCUMENTS

| | | |
|---|---|---|
| WO | WO 01/53925 A1 | 7/2001 |
| WO | WO 2005/109165 A2 | 11/2005 |

OTHER PUBLICATIONS

Author Unknown, 6 Button Simple TV Remote, Abstract only available, Abstract from Evalueserve Report, dated Aug. 7, 2006, p. 1.

Author Unknown, Logitech Harmony 890 Advanced Universal Remote, Abstract only available, Abstract from Evalueserve Report, dated Aug. 7, 2006, pp. 1-2.

Author Unknown, User Reviews for Harmony 745/H745/SST-745 from Logitech, Abstract only available, Abstract from Evalueserve Report, dated Aug. 7, 2006, p. 1.

Author Unknown, User Reviews for the Take Control TC1000 from Harman/Kardon, Abstract only available, Abstract from Evalueserve Report, dated Aug. 7, 2006, p. 1.

Author Unknown, Scroll 4-Ways with the Tilt Wheel, Abstract only available, Abstract from Evalueserve Report, dated Aug. 7, 2006, pp. 1-2.

Babakhanian, Gregory F., Sony EZ-MOTE, Easy Limited Function TV and VCR Remote, Sony Technical Digest, vol. 3, Nov. 2000, ISSN 1521-5180.

Ruel, Ruel's Review: Netgem Netbox, article dated Dec. 25, 1999, http://ruel.net/top/box.review.netgem.netbox.htm, printed Aug. 22, 2009.

Sony, Integrated Remote Commander Operating Instructions RM-VL 1000, Manual 3-244-192-12(1), pp. 1-84.

* cited by examiner

SYSTEM AND METHOD FOR REMOTE CONTROL OF A TELEVISION WITH A MANUALLY ACTUATABLE ELEMENT

FIELD OF THE INVENTION

The present invention relates generally to remote controls. More particularly, the present invention relates to a television remote control with a manually actuatable element that may be utilized to initiate various remote control functions.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Watching television is a very popular pastime in the United States and other countries. Television viewers often utilize remote controls to manage their television viewing experience. For example, remote controls are used to change channels, scan through recorded video, adjust volume, manipulate viewing settings, enable closed captioning, turn the television on and off, and so forth. To accommodate the introduction of additional functionality (e.g., digital television, sub-channels for broadcast television, digital recording, and the like) traditional remote controls may include a large number of buttons for specific procedures (e.g., buttons to step through channels, buttons to control recording features, number keys to directly input channels, and other specific input options). Further, some traditional remote controls include menu navigation buttons that allow a user to navigate through menus in a step-by-step process based on up, down, left and right (UDLR) commands. Including buttons for all of the available television operation features often results in a large remote control with a large number of buttons that can complicate use of the remote control and intimidate users.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

There is provided a system and method for remote control of a television using a manually actuatable element. More specifically, in one embodiment, there is provided a remote control for a television. The remote control may comprise a manually actuatable control element configured to generate a signal in response to an activation of the control element by a user, wherein the signal is generated at one of a plurality of different levels based on a characteristic of the activation, and a control system configured to receive the signal and to produce one of a plurality of television commands in response to the signal, wherein the command produced corresponds to the level of the signal.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
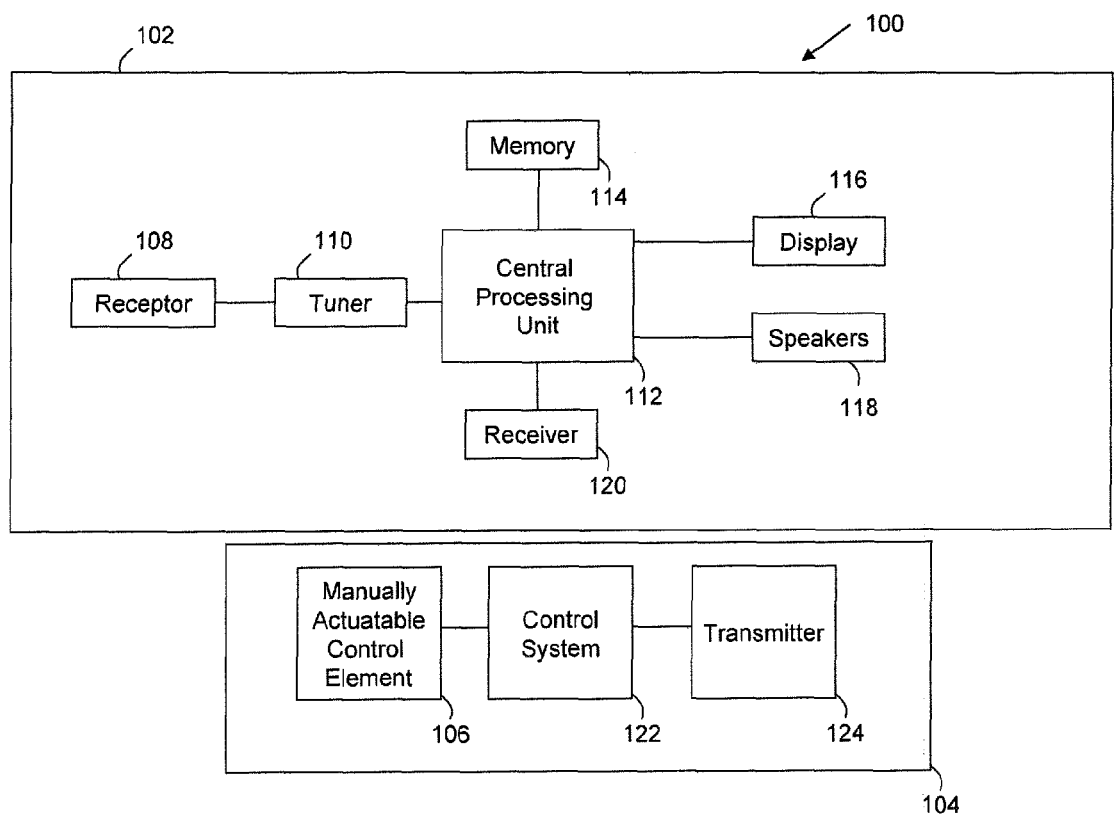
FIG. 1 is a block diagram of a television system in accordance with an exemplary embodiment of the present invention.

FIG. 1 is a block diagram of a television system in accordance with an exemplary embodiment of the present invention. The television system is generally indicated by reference numeral 100. The television system 100 includes a television 102 and a remote control 104 that cooperate to facilitate operation of the television 102 by a user. Specifically, in accordance with exemplary embodiments, the remote control 104 includes a manually actuatable control element 106 that facilitates user selection of a number of different television commands. For example, a user may provide a command (e.g., a command to increase volume or tune another channel) to the television 102 by physically manipulating the control element 106 of the remote control 104 in a manner that corresponds to the desired command. This may include utilizing the control element 106 to navigate a menu of available command selections, scroll through channels, increase/decrease audio volume, and so forth at variable speeds depending on a manner in which the control element is activated. In other words, present embodiments may control operational features of the television 102 based on certain activation characteristics observed via the control element 106. Indeed, the control element 106 may control all operational features associated with the television 102. In some embodiments, it may be desirable to exclude power-on and/or power-off operations from the features controlled by the control element 106, and utilize a separate button (e.g., a power button) to turn the television on and/or off.

The remote control 104 translates physical manipulation of the control element 106 into a command (e.g., data presented via electrical signals, radio signals, or light signals) and communicates the command to the television 102. The television 102 receives the command and performs a function (e.g., increase the volume or change the channel) based on the command. The function may be selected from a table stored in the television 102 that correlates various commands with various functions. In other words, the television 102 may translate the command received from the remote control 104 into a function using a correlation table. In the illustrated embodiment, the command is communicated wirelessly from the remote control 104 to the television 102. However, in some embodiments, the command may be communicated via a wire or cable.

The television 102 includes a receptor 108 (e.g., a cable inlet or antenna), a tuner 110, a central processing unit or processor 112, a memory 114, a display 116, speakers 118, and a receiver 120. The receptor 108 may be adapted to receive signals (e.g., audio and video signals) from a provider, such as a terrestrial broadcaster or a cable head-end. The tuner 110 may be adapted to facilitate selection of certain provider signals for presentation on the display 116 and over the speakers 118. The memory 114 may be adapted to hold machine-readable computer code that causes the processor 112 to perform an exemplary method based on signals received from the remote control 104. The receiver 120 may be adapted to facilitate communication between the television 102 and the remote control 104. For example, in the illustrated embodiment, the receiver 120 is adapted to receive wireless signals or commands from the remote control 104 and communicate the commands to the processor 112.

The remote control 104 includes the manually actuatable control element 106, a control system 122, and a signal transmitter 124. The control element 106 may be adapted to facilitate selection of a number of different commands via simplified user interaction with the control element 106. For example, the control element 106 may include a joystick, a scroll wheel, or a tilt disk that enables a user to make direct commands, navigate through a menu, rapidly scroll through menu items, and make selections in the menu. In some embodiments, the control element 106 may cooperate with other control features (e.g., buttons) to facilitate a user's control of the television. The control system 122 may receive one or more signals from the control element 106 and produce one of a plurality of television commands in response to the one or more signals. The transmitter 124 communicates the commands to the television 102 as electrical signals, radio signals, light signals, or the like.

Figure 2:
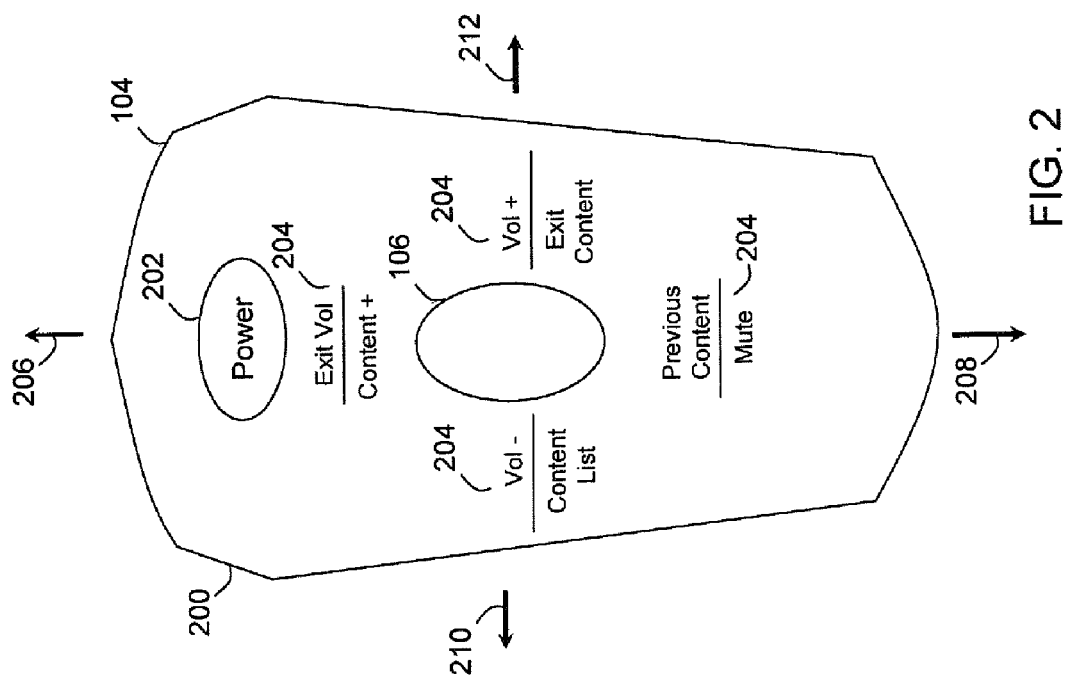
FIG. 2 is an overhead view of a remote control in accordance with an exemplary embodiment of the present invention.
Figure 3:
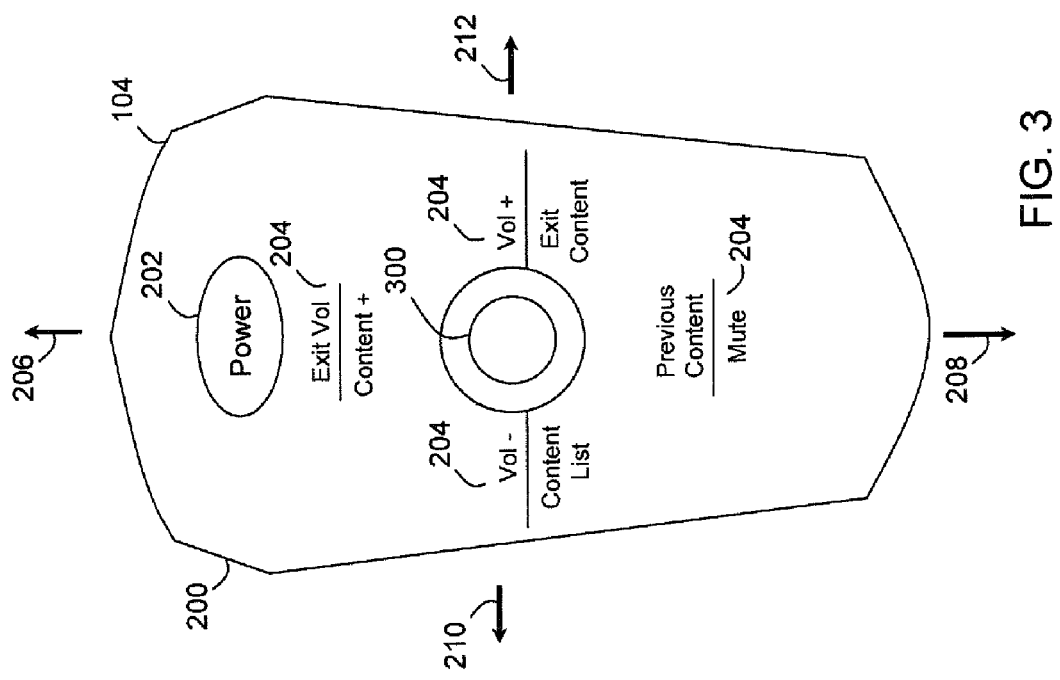
FIG. 3 is an overhead view of a remote control with a joystick in accordance with an exemplary embodiment of the present invention.
Figure 4:
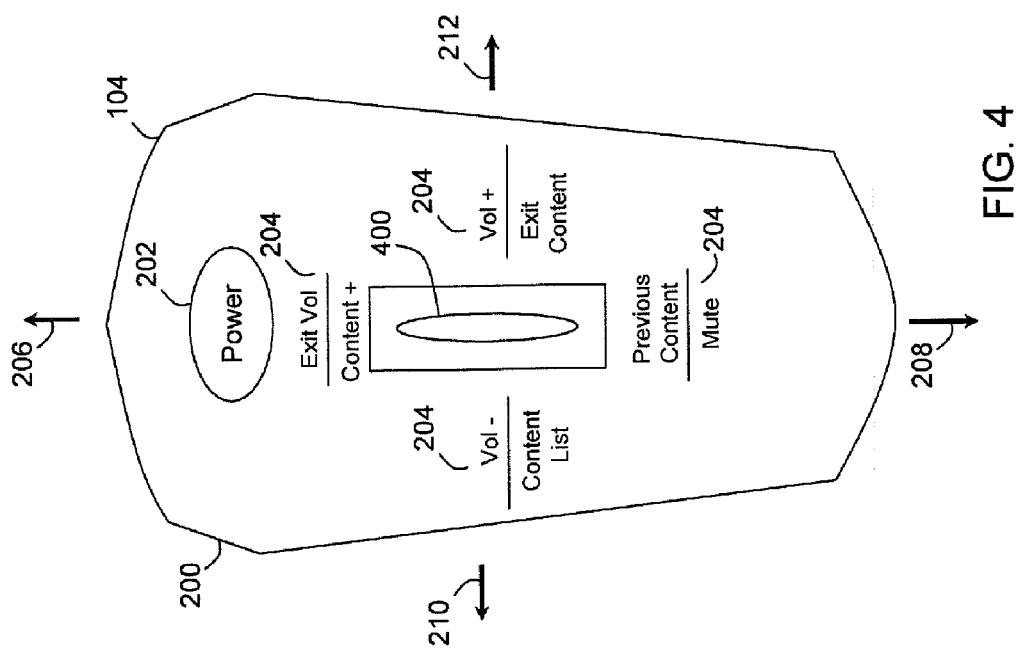
FIG. 4 is an overhead view of a remote control with a scroll wheel in accordance with an exemplary embodiment of the present invention.
Figure 5:
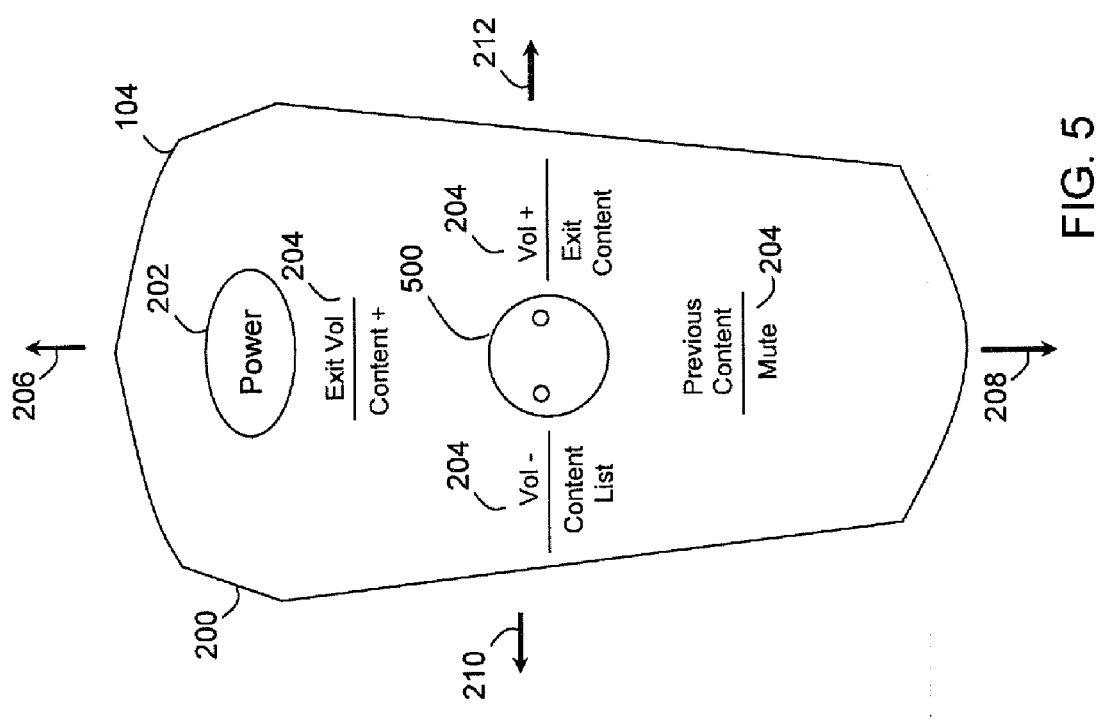
FIG. 5 is an overhead view of a remote control with a tilt disk in accordance with an exemplary embodiment of the present invention.

FIG. 2 is an overhead view of the remote control 104 in accordance with an exemplary embodiment of the present invention. The remote control 104 includes a body 200, the control element 106, a power button 202, and text indicators 204. As set forth above, the control element 106 may include one of various control element types. For example, the control element may include a joystick 300, as illustrated in FIG. 3, a scroll wheel 400, as illustrated in FIG. 4, or a tilt disk 500, as illustrated in FIG. 5. For example, the control element 106 may include a tiltable scroll wheel that can be activated by tilting it to the left or right to activate certain features. It should be noted that embodiments that utilize a tiltable scroll wheel enable navigation in at least four directions with the tiltable scroll wheel. For example, up and down navigation may be achieved by rolling the tiltable scroll wheel in the corresponding direction, and navigation left and right may be achieved by tilting the scroll wheel in the corresponding direction.

The power button 202 is representative of various different types of additional input features that may supplement operation of the control element 106. For example, the tilt functions of the tiltable scroll wheel discussed above may be replaced by separate buttons on the left and right of the scroll wheel. However, it should be noted that some embodiments of the present invention merely include the control element 106 alone. Indeed, no other buttons may be utilized because the control element may be configured to control all of the controllable features related to the television 102. In other embodiments, the control element 106 may serve to control all controllable features of the television 102 except power, which may be controlled by the power button 202.

The text indicators 204 may provide a user with information relating to what commands are related to manners of activating the control element 106. For example, the text indicators 204 around the control element 106 may indicate that pressing or rolling the control element 106 in the direction of the text will initiate a command described by the text indicators 204. In some embodiments, multiple text indicators 204 may be associated with a single direction because different commands may be initiated depending on a characteristic of activation or a mode in which the remote control 104 is operating.

In the illustrated embodiment of FIG. 2, the control element 106 is adapted for activation in an up direction 206, a down direction 208, a left direction 210, and a right direction 212. In some embodiments, the control element 106 may be activated by pressing it toward the remote control 104 along a vertical axis of the control element 106 (e.g., directly down). For example, if the control element 106 is a joystick, it may be activated by pushing the top of the joystick toward its base in the direction of the joystick's length. Similarly, if the control element 106 is a tilt disk or a scroll wheel, it may be activated by pushing directly down on a central portion of the tilt disk or scroll wheel. In some embodiments, multiple buttons may be arranged beneath the control element 106 such that they are activated based on what manner and/or in what direction the control element 106 is activated.

Activating the control element 106 in a particular manner, such as activating it in one of the directions 206, 208, 210, 212, or a combination of directions, may cause the remote control to initiate specific television commands. For example, pushing directly down on the control element 106 may initiate a "select" function to enable a user to select menu options. Further, if the activation of the control element 106 has certain characteristics, different commands may be initiated or the commands may be modified. For example, if the control element 106 is activated for a certain amount of time in a particular direction or to a certain degree in a particular direction, the command associated with activation in that direction may be modified to perform more rapidly.

Manipulation or activation of the control element 106 may facilitate initiation of television commands, navigation of a menu, or cause change in a mode of operation based on one or more characteristics of the activation. In one embodiment, if a user presses the control element 106 in a particular direction, a corresponding signal is sent to the control system 122. The control system 122 then translates the signal into a command for communication to the television 102 by the transmitter 124. For example, if the control element 106 is initially pushed in the up direction 206, the various features of the remote control 104 may cooperate to provide a command corresponding to various television operations, such as bringing up an on-screen display, tuning a next channel, or increasing/decreasing an audio volume. The television 102 may include a table in the memory 114 that correlates received commands to particular actions to be taken by the television 102.

The signal produced by the control element 106 as a result of being activated may be generated at one of a plurality of different levels based on a characteristic of the activation. Further, the commands produced by the remote control 104 may correspond to the level of the signal, thus changing the operation of the television 102 based on the signal level. Several different activation characteristics may be utilized to change the level of the signal. For example, among other characteristics, a length of time that the control element 106 is activated, a number of times the control element 106 is activated consecutively in a certain period of time, or a respective distance traveled by a portion of the control element 106 during activation are activation characteristics that may impact signal levels. Certain activation characteristics may depend on whether the control element 106 is of a certain type. For example, different activation characteristics may be associated with a joystick, a tilt disk, a scroll wheel, or other control element types.

In accordance with an exemplary embodiment, if the control element 106 includes a joystick, an activation characteristic may include the extent to which the joystick is pressed in a certain direction. For example, if the joystick is pressed partially in the up direction 206, it may produce a signal at a first level. Based on this signal level, the control system 122 may generate a command to cycle through channels on the television 102 at a first pace. If the joystick is pressed fully in the up direction 206, it may produce a signal at a second level, and the control system 122 may modify the command to cycle through the channels at a second pace that is more rapid than the first. In some embodiments, multiple different signal levels may be produced depending on the extent to which the joystick is pressed in a direction. In other embodiments, activation characteristics other than a distance the joystick is pushed may be similarly utilized. Indeed, various activation characteristics may have multiple signal levels associated with degrees of activation and these signal levels may correlate to any number of television functions (e.g., channel changing, menu navigation, or volume adjustment).

Multiple different activation characteristics may be considered in determining a signal level. For example, the length of time that activation lasts and/or the number of times activation occurs within a fixed period may be defined as activation characteristics. Further, various activation characteristics may be considered separately or in combination to provide a signal level. For example, referring to the exemplary joystick discussed above, holding the joystick pressed fully in the up direction for a defined period of time may modify the command associated with simply pressing the joystick fully in the up direction 206 such that the channels are cycled through at a third pace that is more rapid than the second pace. Similar correlations between activation characteristics and commands may be applied to various different functions of the television 102. For example, scrolling through menu selections, increasing or decreasing audio volume, setting a clock, and so forth are all commands that may have an increased or decreased pace that is controlled by certain activation characteristics associated with the control element 106.

The joystick described above is merely one example of a correlation between activation of the control element 106 and a television command produced by the remote control 104 in accordance with present embodiments. As set forth above, various different activation characteristics may be associated with different commands. Further, different types of control elements may enable different activation characteristics to be associated with television commands. For example, a user may increase or decrease the speed of scrolling through menu options, cycling through channels or increasing/decreasing audio volume by rolling a scroll wheel more rapidly or more slowly in a desired direction. Similarly, a user may initiate such commands by pressing a tilt disk in a particular direction for a period of time that exceeds one or more thresholds.

In one embodiment, various lengths of time that the control element 106 is activated (e.g., depressed in a particular direction) may cause different signal levels to be produced and, thus, different commands to be issued from the remote control 104. For example, the control element 106 may include a tilt disk that can be depressed in multiple directions to produce different commands. In one embodiment, pressing the tilt disk in a particular direction to provide a continuous command for less than 400 ms may produce a first level signal. The first level signal may correspond to a single command with a first rate (e.g., scroll at a rate of one selection per 20 ms). The level of the signal may be incrementally increased as the continuous command is provided for longer lengths of time. For example, after 2000 ms a second signal level may be reached, after 3000 ms a third signal level may be reached, and so forth. Each signal level may correspond to how rapidly a particular feature is changed. For example, the higher the signal level when scrolling through a menu, the less time each menu option will be displayed before scrolling to the next menu option. If the continuous command stops, the last selection may be displayed for a period of time and then enabled. For example, if a user is scrolling through channels by pressing and holding the tilt disk in the up direction 206 and releases the tilt disk upon reaching a desired channel, the television 102 may display the channel number for 500 ms before actually tuning the selected channel.

As set forth above, certain features of present embodiments may enable a user to scroll through channels on the television 102 at a rapid pace. During the process of scrolling through the channels, embodiments of the present invention may prevent or avoid delays associated with the television 102 attempting to tune each channel that is selected during scrolling. For example, if a user wants to change the channel on a television from channel 2 to channel 26, present embodiments may enable rapid scrolling from channel 2 to channel 26 by preventing intermediate channels from being tuned. Intermediate channels may be defined as channels that are passed over without a delay of a certain amount of time. Specifically, the television 102 may be commanded to avoid tuning a channel until a destination channel is reached, as indicated by resting on selection of the destination channel (e.g., channel 26) for a certain length of time. This may avoid unnecessary time spent on tuning channels that the user has no interest in viewing and simply wishes to pass over while scanning to a desired channel. The prevention of intermediate tuning may be a feature that is initiated in the television 102 based on the level of the signal received from the control element 106.

Figure 6:
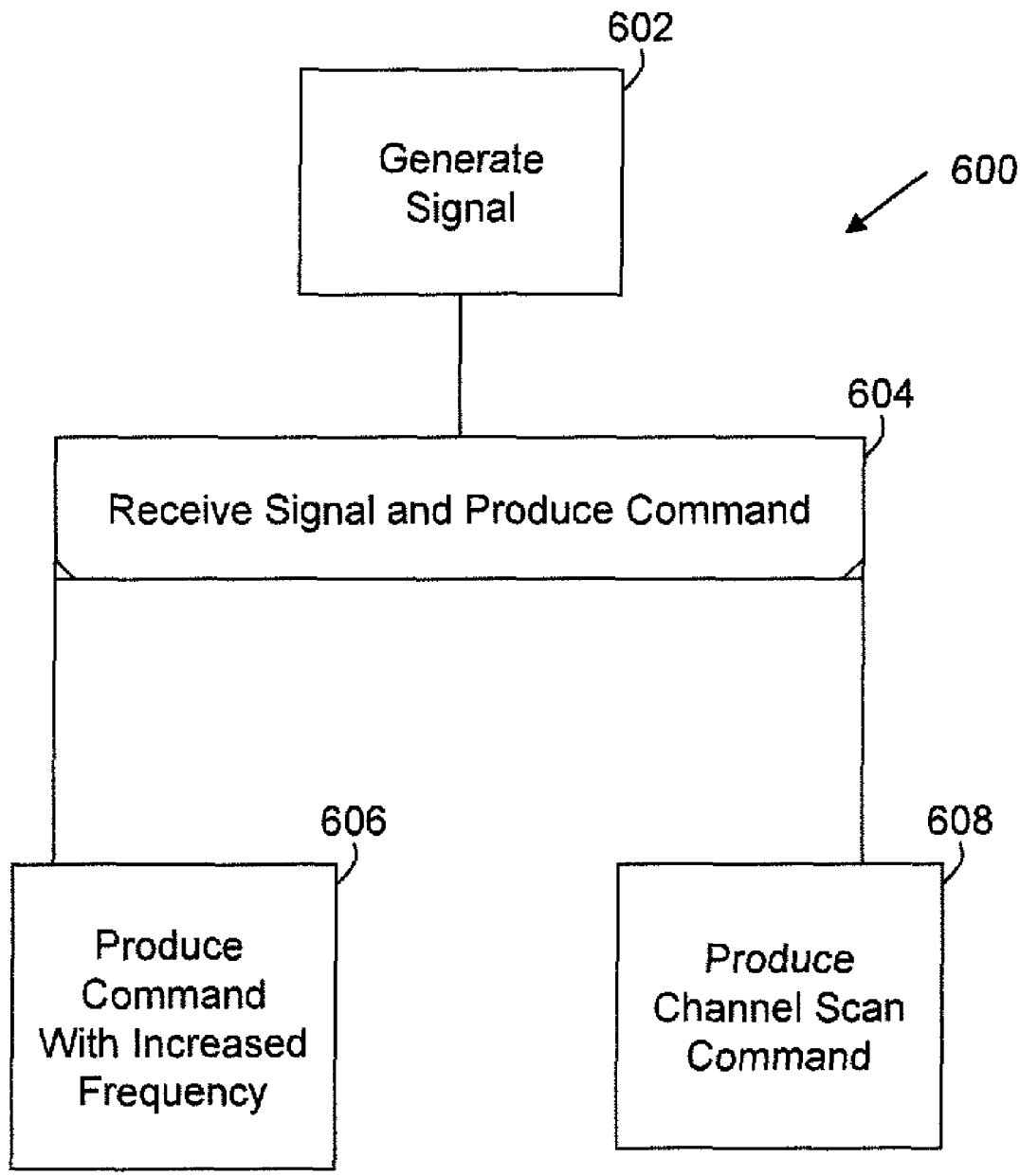
FIG. 6 is a block diagram of a method in accordance with an exemplary embodiment of the present invention.

FIG. 6 is a block diagram of a method in accordance with an exemplary embodiment of the present invention. The method is generally indicated by reference numeral 600. The method 600 includes steps 602, 604, 606, and 608. In some embodiments, as would be appreciated by one of ordinary skill in the art, some steps may be modified, excluded, or additional steps may be included. The step 602 represents generating a signal in response to an activation of a manually actuatable control element, wherein the signal is generated at one of a plurality of different levels based on a characteristic of the activation. The characteristic of the activation of the manually actuatable control element may include a length of time of the activation or a relative distance moved by the manually actuatable control element as a result of the activation. Block 604 represents receiving the signal at a control system and producing one of a plurality of television commands in response to the signal, wherein the command produced corresponds to the level of the signal. Block 606 represents producing the one of the plurality of television commands with increased frequency when the characteristic meets a criterion. Block 608 represent producing a channel scan command that instructs a television to pass through channel selections at a speed based on the level of the signal.

What is claimed is:

1. A remote control for a television, the remote control, comprising:
   a manually actuatable control element configured to generate a signal in response to a linear activation of the control element by a user, wherein the signal is generated at one of a plurality of different levels based on a magnitude of the linear activation; and
   a control system configured to receive the signal and to produce one of a plurality of television commands in response to the level of the signal.

2. The remote control of claim 1, wherein the control system is configured to produce a volume change command that instructs a television to increase or decrease volume at a speed based on the level of the signal.

3. The remote control of claim 1, wherein the control system is configured to produce a menu navigation command that instructs a television to pass through menu selections at a speed based on the level of the signal.

4. The remote control of claim 1, wherein the control system is configured to produce a channel scan command that instructs a television to pass through channel selections at a speed based on the level of the signal.

5. The remote control of claim 1, wherein the television is configured to control all operational features except for power-on and power-off features based on actuation of the control element.

6. The remote control of claim 1, wherein the manually actuatable control element comprises a joystick.

7. The remote control of claim 1, wherein the manually actuatable control element comprises a tilt disk.

8. The remote control of claim 1, wherein the manually actuatable control element comprises a tiltable scroll wheel.

9. A television system, comprising:
   a television; and
   a remote control configured to communicate with the television, the remote control comprising:
   a manually actuatable control element configured to generate a signal in response to a rotational activation of the control element by a user, wherein the signal is generated at one of a plurality of different levels based on a speed of the rotational activation; and
   a control system configured to receive the signal and to produce one of a plurality of television commands in response to the level of the signal.

10. The television system of claim 9, wherein the control system is configured to produce a volume change command that instructs a television to increase or decrease volume at a speed based on the level of the signal.

11. The television system of claim 9, wherein the control system is configured to produce a menu navigation command that instructs a television to pass through menu selections at a speed based on the level of the signal.

12. The television system of claim 9, wherein the control system is configured to produce a channel scan command that instructs the television to pass through channel selections at a speed based on the level of the signal.

13. The television system of claim 9, wherein the television is configured to control all operational features except for power-on and power-off features based on actuation of the control element.

14. A method, comprising:
   generating a signal in response to a single activation of a manually actuatable control element, wherein the signal is generated at one of a plurality of different levels based on a duration of the single activation; and
   receiving the signal at a control system and producing one of a plurality of television commands in response to the level of the signal.

15. The method of claim 14, wherein the control system is configured to produce a volume change command that instructs a television to increase or decrease volume at a speed based on the level of the signal.

16. The method of claim 14, wherein the plurality of television commands comprise all operational features of a television except for power-on and power-off features based on actuation of the control element.

17. The method of claim 14, wherein the control system is configured to produce a menu navigation command that instructs a television to pass through menu selections at a speed based on the level of the signal.

18. The method of claim 14, comprising producing a channel scan command that instructs a television to pass through channel selections at a speed based on the level of the signal.

* * * * *